US011753135B2

(12) United States Patent
Kuhlmann

(10) Patent No.: US 11,753,135 B2
(45) Date of Patent: Sep. 12, 2023

(54) METHOD FOR TRANSPORTING A PAYLOAD TO A TARGET LOCATION, AND RELATED HYBRID AIRSHIP

(71) Applicants: TOTAL SA, Courbevoie (FR); FLYING WHALES, Suresnes (FR)

(72) Inventor: François Hervé Kuhlmann, Montrouge (FR)

(73) Assignees: TOTAL SA, Courbevoie (FR); FLYING WHALES, Suresnes (FR)

( * ) Notice: Subject to any disclaimer, the term of this patent is extended or adjusted under 35 U.S.C. 154(b) by 0 days.

(21) Appl. No.: 16/763,602

(22) PCT Filed: Nov. 13, 2017

(86) PCT No.: PCT/IB2017/001544
§ 371 (c)(1),
(2) Date: May 13, 2020

(87) PCT Pub. No.: WO2019/092471
PCT Pub. Date: May 16, 2019

(65) Prior Publication Data
US 2020/0361589 A1 Nov. 19, 2020

(51) Int. Cl.
*B64B 1/34* (2006.01)
*B64B 1/22* (2006.01)
(Continued)

(52) U.S. Cl.
CPC .................. *B64B 1/34* (2013.01); *B64B 1/22* (2013.01); *B64D 9/00* (2013.01); *G05D 1/101* (2013.01); *B64B 2201/00* (2013.01)

(58) Field of Classification Search
CPC ......... B64B 2201/00; B64B 1/22; B64B 1/32; B64B 1/34
See application file for complete search history.

(56) References Cited

U.S. PATENT DOCUMENTS 4,695,012 A * 9/1987 Lindenbaum ............. B64B 1/24
244/137.4
5,823,468 A * 10/1998 Bothe .................. B64C 29/0033
244/2
(Continued)

FOREIGN PATENT DOCUMENTS

| EP | 2 272 754 A1 | 1/2011 |
| WO | 2009/152604 A1 | 12/2009 |
| WO | 2012/135876 A2 | 11/2012 |

OTHER PUBLICATIONS

International Search Report issued in corresponding International Patent Application No. PCT/IB2017/001544 dated May 11, 2018.

*Primary Examiner* — Philip J Bonzell
*Assistant Examiner* — Colin Zohoori
(74) *Attorney, Agent, or Firm* — TROUTMAN PEPPER HAMILTON SANDERS LLP

(57) ABSTRACT

The method for transporting a payload to a target location, comprises the following steps of providing a hybrid airship comprises a buoyancy enclosure, a gondola carried by the buoyancy enclosure and a payload carrier, and at least one propeller; flying the hybrid airship carrying the payload to a target location, flying the hybrid airship carrying the payload comprising generating a lift force with the at least one propeller. Flying the hybrid airship carrying the payload comprises tilting the longitudinal axis of the buoyancy enclosure to a positive pitch to generate an aerodynamic lift force when the hybrid airship carrying the payload moves longitudinally.

17 Claims, 5 Drawing Sheets

(51) Int. Cl.
*B64D 9/00* (2006.01)
*G05D 1/10* (2006.01)

(56) References Cited

U.S. PATENT DOCUMENTS

| | | | |
|---|---|---|---|
| 6,196,498 B1 * | 3/2001 | Eichstedt | B64B 1/20 244/25 |
| 6,860,449 B1 * | 3/2005 | Chen | B64B 1/06 244/12.1 |
| 2007/0102571 A1 | 5/2007 | Colting | |
| 2009/0072082 A1 | 3/2009 | Arel | |
| 2012/0248241 A1 * | 10/2012 | Goelet | B64B 1/68 244/30 |
| 2016/0161625 A1 | 9/2016 | Partner et al. | |

* cited by examiner

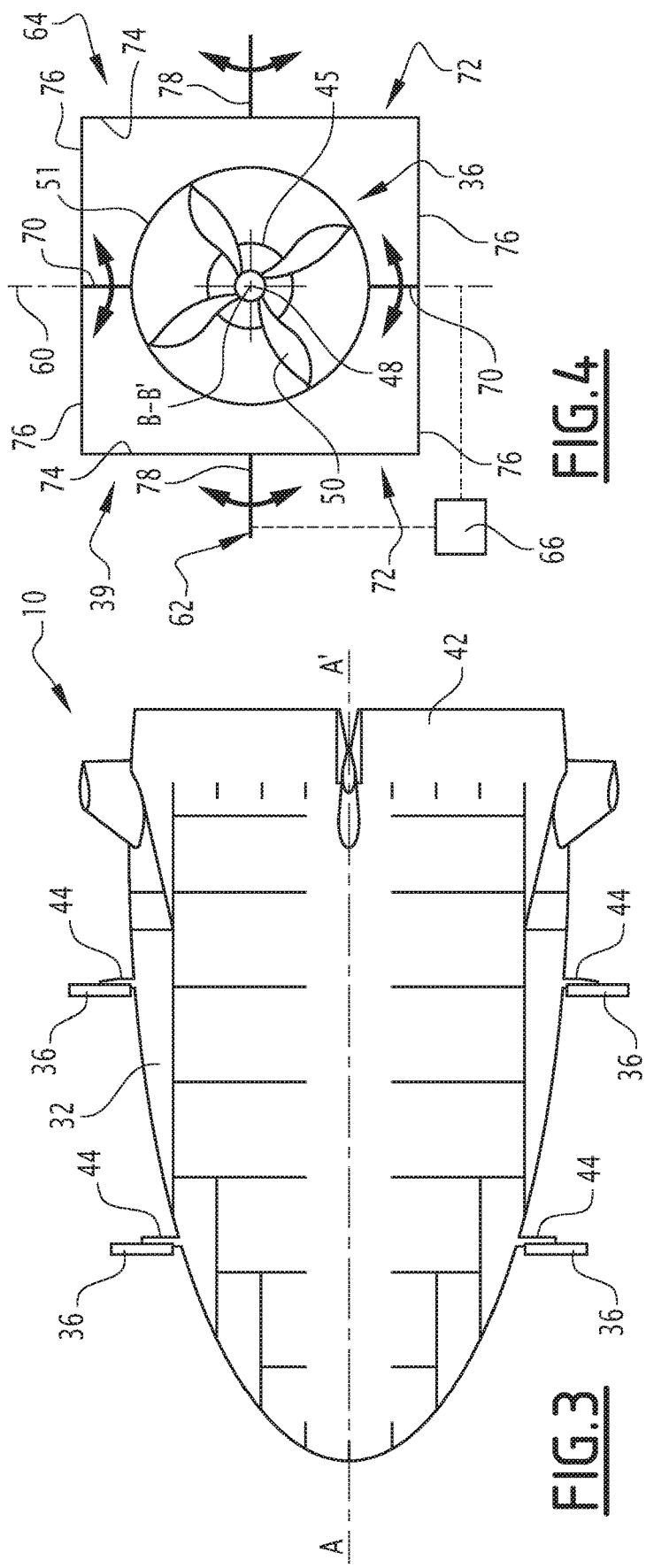
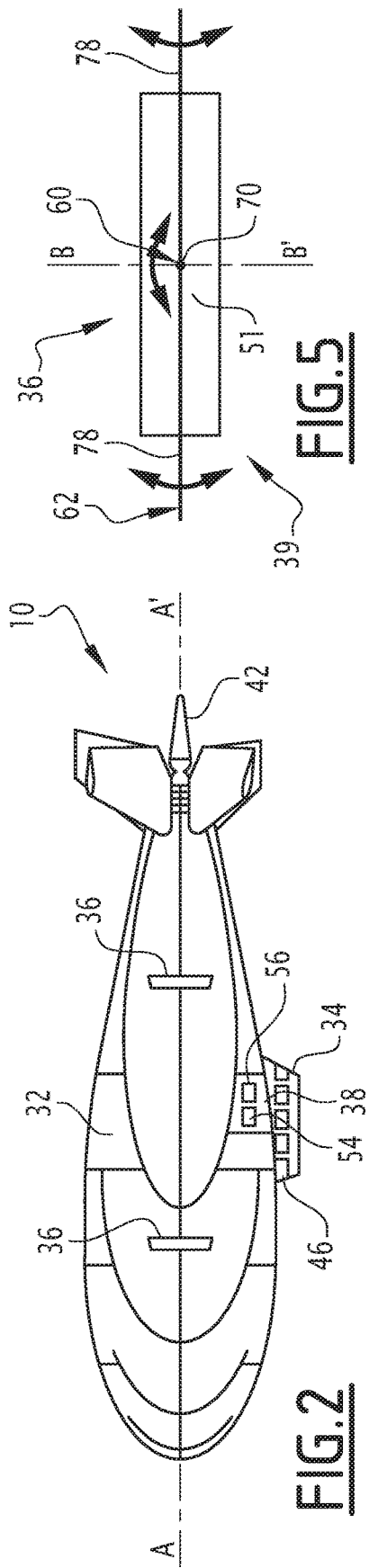

METHOD FOR TRANSPORTING A PAYLOAD TO A TARGET LOCATION, AND RELATED HYBRID AIRSHIP

CROSS REFERENCE TO RELATED APPLICATION

This is a U.S. National Phase Application under 35 U.S.C. § 371 of International Patent Application No. PCT/IB2017/001544, filed Nov. 13, 2017. The entire contents of which are hereby incorporated by reference.

FIELD OF THE INVENTION

The present invention concerns a method for transporting a payload to a target location, comprising the following steps:

providing a hybrid airship comprising a buoyancy enclosure containing a gas lighter than air, the buoyancy enclosure having a longitudinal axis, the hybrid airship comprising a gondola carried by the buoyancy enclosure and a payload carrying apparatus connected to said buoyancy enclosure, at least one propeller comprising at least a blade able to generate a force when rotated around a propeller axis, and a mechanism for controlling the orientation of the at least one propeller with regard to the buoyancy enclosure around at least one axis to modify the orientation of the force generated by the at least one propeller;

flying the hybrid airship carrying the payload to the target location, flying the hybrid airship carrying the payload comprising generating a lift force with the at least one propeller.

BACKGROUND

The hybrid airship is in particular intended to carry heavy payloads to remote locations with a difficult access, in particular regions in which access by road is tedious or impossible.

For example, the payloads are used in oil and gas exploration activities in a remote region with a difficult access. The region in particular comprises a high density of vegetation, such as a forest, in particular a tropical forest. Also, the region may comprise rugged terrain such as hills (for example foothills), cliffs and/or mountains. The region may sometimes comprise dangerous to access areas, such as areas with unexploded ordinances (UXO's).

Generally, helicopters are used to carry payloads to such regions. Nevertheless, helicopters are expensive to operate and generate a high quantity of greenhouse gases. Helicopters are also very limited in the amount of payload they can carry.

SUMMARY

Hybrid airships are a very efficient and environmentally friendly alternate to transport heavy payloads to a target location. They are able to carry heavier payloads with minimal fuel consumption. They are silent and can be propelled with thermal generators providing electrical power to propellers.

US 2007/0102571 discloses an airship of the above mentioned type. The airship comprises several propellers with a fixed vertical orientation with respect to the buoyancy enclosure. The tilting of the blades of the propellers is adjustable. When the airship is lighter than air, e.g. when it does not carry a payload or when the payload carried by the airship is smaller than a few tons, the propellers generate a descent force able to compensate for the positive buoyancy of the airship. On the contrary, when the airship is heavier than air, e.g. when it carries a payload greater than a few tons, the propellers generate a lift force which is used in addition with the buoyancy.

Such an airship is not fully satisfactory. When the weight of the payload to be transported increases, the airship size must be increased to provide more buoyancy and/or the propellers size and power should be enhanced to provide more propulsive lift force.

The increase of size and/or propulsive power is not adapted to remote environments, since it is more difficult to carry the airship to the base camp from which it is flown and/or since it requires additional fuel which is also tedious to transport.

One aim of the invention is to provide a method of transporting heavy payloads to remote locations with a hybrid airship which does not require a significant increase of airship size and/or of fuel consumption.

To this aim, the subject-matter of the invention is a method of the above type, characterized in that flying the hybrid airship carrying the payload comprises tilting the longitudinal axis of the buoyancy enclosure to a positive pitch to generate an aerodynamic lift force when the hybrid airship carrying the payload moves longitudinally.

The method according to the invention comprises one or more of the following features, taken solely, or according to any technical feasible combination:

the positive pitch is greater than 0.5° and is advantageously comprised between 0.5° and 15°, in particular from 0.5° to 5°;

the method comprises, before flying the hybrid airship carrying the payload to the target location:

flying the hybrid airship to the payload and connecting the payload carrying apparatus to the payload, lifting the payload, and, after flying the hybrid airship carrying the payload to the target location:

descending the hybrid airship and the payload to drop the payload at the target location;

the method comprises, after dropping the payload at the target location, flying back the hybrid airship without a payload, or with a payload such that the combined hybrid airship plus payload has a buoyancy lighter than air, the flying back of the hybrid airship comprising tilting the longitudinal axis of the buoyancy enclosure to a negative pitch to generate an aerodynamic descent force when the hybrid airship moves longitudinally;

flying back the hybrid airship comprises generating a descent force with the at least one propeller;

flying the hybrid airship to the payload comprises generating a lift force with the at least one propeller to lift the airship to a target altitude;

flying the hybrid airship to the payload comprises, after reaching the target altitude, tilting the longitudinal axis of the buoyancy enclosure to a negative pitch to generate an aerodynamic descent force when the hybrid airship moves longitudinally;

flying the hybrid airship carrying the payload to the target location comprises actuating the mechanism for controlling the orientation of the at least one propeller to generate a force having a component transverse to the longitudinal axis to transversally adjust the position of the longitudinal axis of the buoyancy enclosure with respect to the target location;

the mechanism for controlling the orientation of the at least one propeller comprises a first pivot axis of the at least one propeller with regard to the buoyancy enclosure which is at least substantially vertical when the propeller axis is horizontal, and the mechanism for controlling the orientation of the at least one propeller rotates the at least one propeller around the first pivot axis to generate the force having a component transverse to the longitudinal axis;

the mechanism for rotating the at least one propeller comprises a second pivot axis of the at least one propeller with regard to the buoyancy enclosure which is at least substantially horizontal when the longitudinal axis is horizontal, and the mechanism for controlling the orientation of the at least one propeller rotates the at least one propeller around the second pivot axis to generate the lift force;

the first pivot axis is rotatable around the second pivot axis, and rotating the at least one propeller around the second pivot axis generates a rotation of the first pivot axis around the second pivot axis;

the transverse adjustment of the position of the longitudinal axis is carried out without longitudinally moving the hybrid airship.

The invention further concerns a hybrid airship comprising:
 a buoyancy enclosure containing a gas lighter than air, the buoyancy enclosure having a longitudinal axis,
 a gondola carried by the buoyancy enclosure;
 a payload carrying apparatus connected to said buoyancy enclosure;
 at least one propeller comprising at least a blade able to generate a force when rotated around a propeller axis; and
 a mechanism for controlling the orientation of the at least one propeller with regard to the buoyancy enclosure around at least one axis to modify the orientation of the generated force, the mechanism for controlling the orientation of the at least one propeller being able to control the orientation of the at least one propeller to generate a lift force with the at least one propeller when flying the hybrid airship carrying the payload,
 characterized by a tilting controller able to tilt the longitudinal axis of the buoyancy enclosure to a positive pitch to generate an aerodynamic lift force when the hybrid airship carrying the payload moves longitudinally.

The airship according to the invention comprises one or more of the following features, taken solely, or according to any technical feasible combination:
 the mechanism for controlling the orientation of the at least one propeller is able to control the orientation of the at least one propeller to generate a force having a component transverse to the longitudinal axis to transversally adjust the position of the longitudinal axis of the enclosure with respect to the target location;
 the mechanism for controlling the orientation of the at least one propeller comprises a first pivot axis of the at least one propeller with regard to the buoyancy enclosure which is at least substantially vertical when the propeller axis is horizontal, the mechanism for controlling the orientation of the at least one propeller being able to rotate the at least one propeller around the first pivot axis to generate the force having a component transverse to the longitudinal axis.

The invention also concerns a method for transporting a payload to a target location, comprising the following steps:
 providing a hybrid airship comprising a buoyancy enclosure containing a gas lighter than air, the buoyancy enclosure having a longitudinal axis, the hybrid airship comprising a gondola carried by the buoyancy enclosure and a payload carrying apparatus, at least one propeller comprising at least a blade able to generate a force when rotated around a propeller axis, and a mechanism for controlling the orientation of the at least one propeller with regard to the buoyancy enclosure around at least one axis to modify the orientation of the force generated by the at least one propeller;

flying the hybrid airship carrying the payload to the target location, flying the hybrid airship carrying the payload comprising generating a lift force with the at least one propeller;

wherein flying the hybrid airship carrying the payload to the target location comprises actuating the mechanism for controlling the orientation of the at least one propeller to generate a force having a component transverse to the longitudinal axis to transversally adjust the position on the longitudinal axis of the buoyancy enclosure with respect to the target location.

The method according to the invention does not necessarily comprise a step in which flying the hybrid airship carrying the payload comprises tilting the longitudinal axis of the buoyancy enclosure to a positive pitch to generate an aerodynamic lift force when the hybrid airship carrying the payload moves longitudinally.

It may comprise one or more of the features mentioned above, taken solely, or according to any technical feasible combination.

The invention also concerns a hybrid airship for transporting a payload to a target location, comprising:
 a buoyancy enclosure containing a gas lighter than air, the buoyancy enclosure having a longitudinal axis,
 a gondola carried by the buoyancy enclosure;
 a payload carrying apparatus;
 at least one propeller comprising at least a blade able to generate a force when rotated around a propeller axis; and
 a mechanism for controlling the orientation of the at least one propeller with regard to the buoyancy enclosure around at least one axis to modify the orientation of the generated force, the mechanism for controlling the orientation of the at least one propeller being able to control the orientation of the at least one propeller to generate a lift force with the at least one propeller when flying the hybrid airship carrying the payload,
 wherein the mechanism for controlling the orientation of the at least one propeller is able to control the orientation of the at least one propeller to generate a force having a component transverse to the longitudinal axis to transversally adjust the position of the longitudinal axis of the enclosure with respect to the target location.

The airship according to the invention does not necessarily have a tilting controller able to tilt the longitudinal axis of the buoyancy enclosure to a positive pitch to generate an aerodynamic lift force when the hybrid airship carrying the payload moves longitudinally.

It may comprise one or more of the features mentioned above, taken solely, or according to any technical feasible combination.

BRIEF DESCRIPTION OF THE DRAWINGS

The invention will be better understood, upon reading of the following description, given solely as an example, and made in reference to the appended drawings, in which:
FIG. 2 is a side view of an airship according to the invention;
FIG. 3 is a top view of the airship of FIG. 2;

FIG. 4 and FIG. 5 are respectively a schematic front view and a schematic top view of a propeller of the airship of FIG. 2, and of a mechanism for controlling the orientation of the propeller;

DETAILED DESCRIPTION OF THE DRAWINGS

Figure 1:
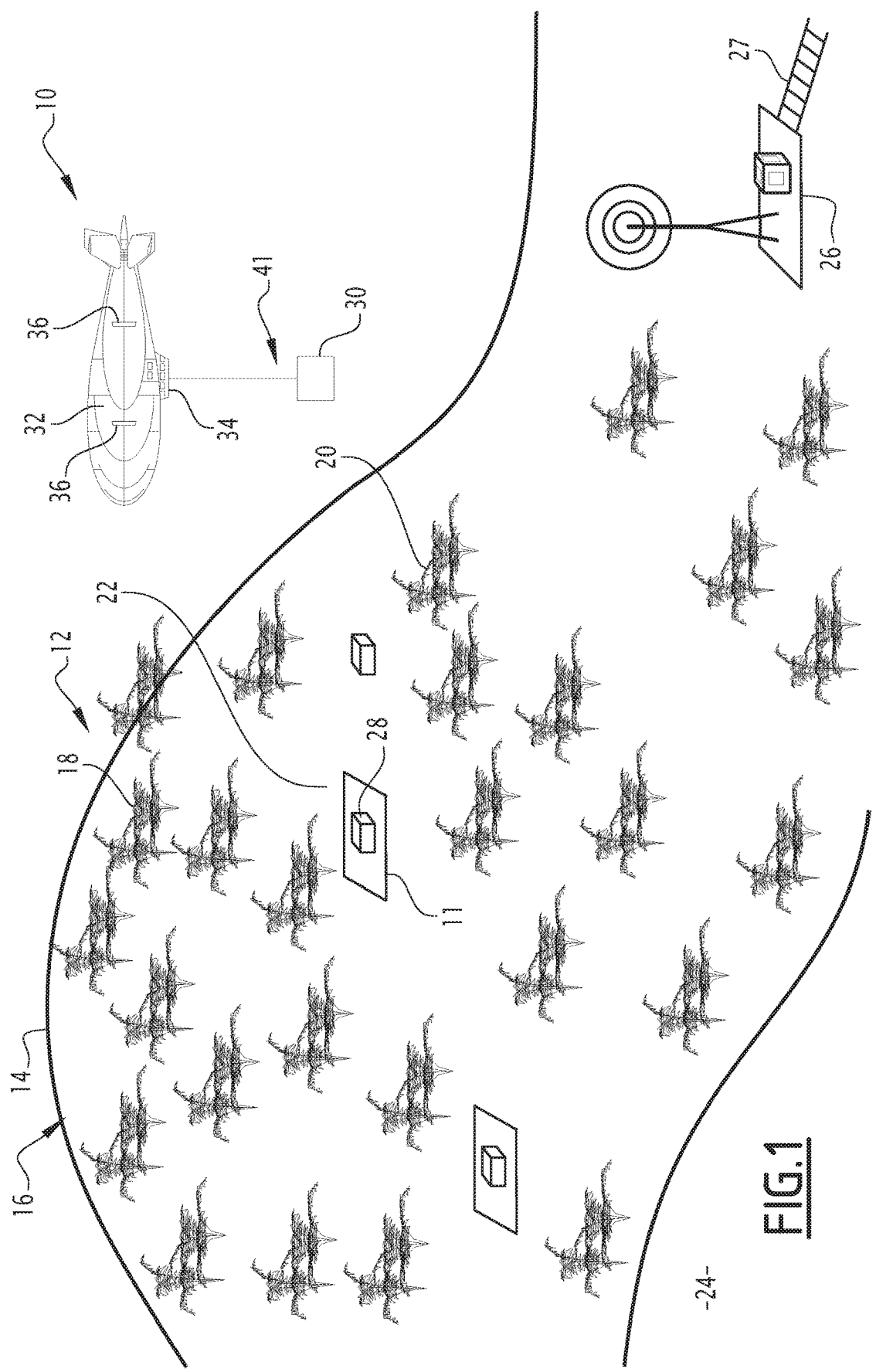
FIG. 1 is a schematic view of a region of interest.

A first hybrid airship 10 used for transporting a payload 30 to a target location 11 in a region of interest 12 with a method according to the invention, is shown in FIG. 1. The hybrid airship 10 flies above the region of interest 12.

The region of interest 12 is for example a region having an uneven terrain 14. The uneven terrain 14 in particular comprises hills, mountains, cliffs or any type of rugged terrain. The region of interest 12 is for example located on foothills which are difficult to access.

The region of interest 12 further comprises vegetation 16. The vegetation 16 is for example a forest, in particular a tropical forest. The region of interest 12 here comprises a high density of vegetation, for example trees 18 forming a canopy 20 which covers a majority of the surface of the ground in the region of interest 12.

In the region of interest 12, the vegetation 16 defines a plurality of natural and/or artificial clearings 22.

The clearings 22 are spread in the region of interest 12, at a distance generally comprised between 100 m and 500 m, preferentially around 300 m, taken along the line of sight between two adjacent clearings 22.

The clearings 22 generally have a surface area greater than 25 m², at the ground level and generally greater than 200 m², or even greater than 900 m² at the top of the canopy 20.

A clearing 22 is for example defined in a OGP Standard "OGP-Helicopter Guideline for Land Seismic and Helirig operations—Report 420 version 1.1 June 2013.

The subsurface 24 located below the ground comprises layers of geological formation and potentially oil and gas reservoirs.

In order to carry out an exploration or an exploitation of the oil and gas reservoirs, the region of interest 12 comprises at least a base camp 26 and a secondary camp 28. The base camp 26 and the secondary camp 28 are separated from a distance generally comprised between 5 km and 20 km, preferentially around 10 km.

The base camp 26 is advantageously accessible by a road 27. The equipment and necessities are provided to the base camp 26 for example by trucks driving on the road 27.

The secondary camp 28 is closer from the clearings 22 than the base camp 26 and is not accessible by any road.

The secondary camp 28 and the clearings 22 are separated from a distance generally comprised between 200 m and 10 km, preferentially around 5 km.

The hybrid airship 10 is configured to take off from the ground, to fly in the surrounding air and to land on the ground.

As shown in FIG. 2 and FIG. 3, the hybrid airship 10 extends along a longitudinal axis A-A'.

The hybrid airship 10 is configured to take-off and land substantially vertically and to move substantially along the longitudinal axis A-A' during the flight.

The hybrid airship 10 is configured to carry a payload 30 from the base camp 26 to the secondary camp 28 and, vice versa, from the secondary camp 28 to the base camp 26.

The hybrid airship 10 may also be used to carry the payload 30 from the secondary camp 28 to other clearings 22 and, vice versa, from the clearings 22 to the secondary camp 28.

The payload 30 transported from the base camp 26 to the secondary camp 28 is for example camp equipment such as tents, water supply, fuel or food. It also comprises equipment for exploration and/or exploitation of oil and gas, such as seismic equipment and/or drilling equipment.

The payload 30 transported from the secondary camp 28 to the base camp 26 is for example camp wastes, or used equipment.

The payload 30 transported from the secondary camp 28 to the clearings 22 is for example seismic equipment for exploration and/or drilling equipment.

The payload 30 may include in some instances an injured or sick worker for medical evacuation.

The hybrid airship 10 is configured to carry a payload 30 weighing in particular between 0 tons and 2 tons.

When filled with a gas lighter than air, the negative weight of the hybrid airship 10 when not carrying the payload is generally of around 50% of the maximum weight of the payload 30, e.g. around—1 ton.

As shown in FIG. 2 and FIG. 3, the hybrid airship 10 comprises a buoyancy enclosure 32, a gondola 34 attached below the buoyancy enclosure 32, at least one propeller 36 to generate a force, at least one generator 38 providing power to the or each propeller 36. According to the invention, the hybrid airship 10 further comprises, for each propeller 36, a mechanism 39 for controlling the orientation of the propeller 36 and of the force generated by the controller 39 (see FIG. 4 and FIG. 5).

The hybrid airship 10 further comprises a payload carrying apparatus 41.

The buoyancy enclosure 32 contains a gas lighter than air, meaning that the gas has a density lower than the surrounding air at 20° C. and 1 atm. The gas is advantageously helium.

When filled with the gas lighter than air, the buoyancy enclosure 32 provides positive buoyancy in air of the hybrid airship 10.

The buoyancy enclosure 32 extends along the longitudinal axis A-A'.

As shown in FIG. 2 and FIG. 3, the buoyancy enclosure 32 here has a wing shape with an ovoid contour, taken in a plane transverse to axis A-A'. The ovoid contour limits the aerodynamic drag.

When the airship 10 is horizontal, the ratio between the maximal vertical height of the buoyancy enclosure 32 taken perpendicularly to axis A-A' and the maximal length of the buoyancy enclosure 32 taken along the longitudinal axis A-A' is comprised between 20% and 35%.

In a horizontal section, the ratio between the maximal transverse width of the buoyancy enclosure 32 and the maximal length of the buoyancy enclosure 32 is comprised between 25% and 35%.

The buoyancy enclosure 32 advantageously comprises at least one rudder 42 protruding from the buoyancy enclosure 32 and located at the back of the buoyancy enclosure 32 and at least a tilting controller 46 able to control the rudder 42 to modify the pitch angle of the hybrid airship 10.

The pitch angle is here defined as the angle between the longitudinal axis A-A' and the horizontal.

The rudder 42 is configured to stabilize and improve the directional control of the hybrid airship 10. The tilting controller 46 controls the elevator of the rudder 42 to modify the pitch of the hybrid airship 10 to obtain a positive pitch of longitudinal axis A-A' ranging from 0° to 15°, preferentially from 0.5° to 15°, in particular from 0.5° to 5° or a negative pitch of longitudinal axis A-A' from 0° to −15°, preferentially from −0.5° to −15°, in particular from −0.5° to −5°

The gondola 34 here extends along the longitudinal axis A-A'.

Advantageously, the horizontal section of the gondola 34 is oval in order to have an aerodynamic shape limiting the aerodynamic drag.

The gondola 34 is advantageously made of a composite material. For example, the gondola 34 is made of carbon fiber sandwich panels.

The gondola 34 advantageously comprises a cockpit for the pilot of the hybrid airship 10, a cabin to transport passengers or a load, at least one side door and on-board electrical systems.

Each propeller 36 is configured to propel the hybrid airship 10.

The propeller 36 is advantageously attached to the buoyancy enclosure 32 by a mast structure 44 protruding laterally from the buoyancy enclosure 32.

The hybrid airship 10 advantageously comprises at least two propellers 36, for example four propellers 36 placed symmetrically on each side of the buoyancy enclosure 32.

In FIG. 5 and FIG. 5, each propeller 36 here comprises an electrical motor 45, a rotor 48 and several propeller blades 50 protruding from the rotor 48 in a tubular guide 51. When the generator 38 provides electrical power to the electrical motor 48, the electrical motor 48 is rotating the rotor 48 and the blades 50 around a propeller axis B-B' to create an air flow along the tubular guide 51. A force is then generated along the axis B-B'.

The propellers 36 are able to propel the hybrid airship 10 at an air speed up to 100 km/h, and generally at a cruise air speed of substantially 60 km/h.

The hybrid airship 10 is said "hybrid" because its lift is ensured by aerostatic lift due to the buoyancy of the buoyancy enclosure 32 comprising a gas lighter than air, advantageously aerodynamic lift due to the specific wing-like shape of the buoyancy enclosure 32 and potentially vertical thrust due to the propellers 36.

The generator 38 provides electrical power to each propeller 36. It is remote from each of the propellers 36.

The generator 38 and each associated propeller 36 are electrically connected through electrical cables running through the gondola 34 and the enclosure 32.

The generator 38 is deprived of propeller attached to the generator 38.

The generator 38 comprises at least one motor 54 and at least one alternator 56.

The motor 54 is preferably a thermal motor. It is fueled by oil, gas or hydrogen. The motor 54 is configured to produce mechanical energy from the chemical energy of the fuel.

In a variant, the generator 38 is a chemical generator such as a fuel cell.

Each alternator 56 is connected to one of the motors 54. The alternator 56 is configured to produce electrical energy from the mechanical energy provided by the motor 54.

In the example shown in FIG. 2 and FIG. 3, each generator 38 comprises two motors 54 and two alternators 56.

Each alternator 48 is connected to a primary electrical power distribution system (not shown) located in the gondola 34. The primary electrical power distribution system is configured to provide electricity powering the on board electrical systems and to each motor 45 of the propellers 36.

The payload carrying apparatus 41 is for example a hoisting system comprising at least a line deployed from the gondola 34 for example by a winch to carry a payload 30 below the gondola 34. The payload 30 is suspended from the hybrid airship 10 by the payload carrying apparatus 41. The vertical height between the bottom of the gondola 34 and the payload 30 is then generally greater than 10 m and comprised between 10 m and 60 m.

As shown in FIG. 4 and FIG. 5, the control mechanism 39 comprises a first pivoting axis 60 of the propeller 36 with respect to the buoyancy enclosure 32, a second pivoting axis 62 of the propeller 36 with respect to the buoyancy enclosure 32, perpendicular to the first pivoting axis 60 and advantageously, a connecting assembly 64 between the first pivoting axis 60 and the second pivoting axis 62.

The control mechanism 39 further comprises a control unit 66 for controlling the respective pivoting angles of the propeller 36 around the first pivoting axis 60 and around the second pivoting axis 62, to define an orientation of the propeller axis B-B' and of the force generated by the propeller 36.

In this example, the second pivoting axis 62 is a horizontal axis of fixed orientation with respect to the longitudinal axis A-A'. In projection in a horizontal plane containing the longitudinal axis A-A', the second pivoting axis 62 is advantageously perpendicular to the longitudinal axis A-A'.

When the propeller axis B-B' is horizontal, the first pivoting axis 60 is vertical. The connecting assembly connects the first pivoting axis 60 to the second pivoting axis 62 such that when the propeller 36 rotates around the second pivoting axis 62, the first pivoting axis 60 also rotates jointly around the second pivoting axis 62.

Advantageously, the connection assembly 64 is of the "cardan" or "gimbal" type. The first pivoting axis 60 comprises at least one first pivot 70, preferentially two opposed first pivots 70 provided radially on two opposite sides of the propeller tubular guide 51 perpendicularly to the propeller axis B-B'.

The connecting apparatus comprises at least one fork 72, preferentially two opposed forks 72 comprising a base 74 and two arms 76 connecting the opposed first pivots 70 on each side of the propeller tubular guide 51.

The second pivoting axis 62 comprises at least one second pivot 78, preferentially two opposed second pivots 78 provided between each base 74 and the mast structure 44 on the buoyancy enclosure 32.

Figure 6:
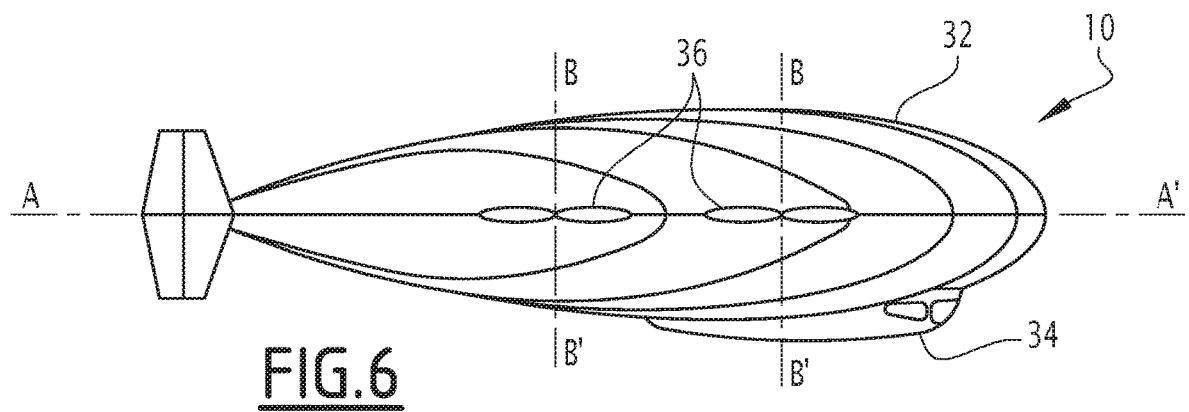
FIG. 6 to FIG. 8 illustrate different configurations of the propellers when the airship flies.
Figure 7:
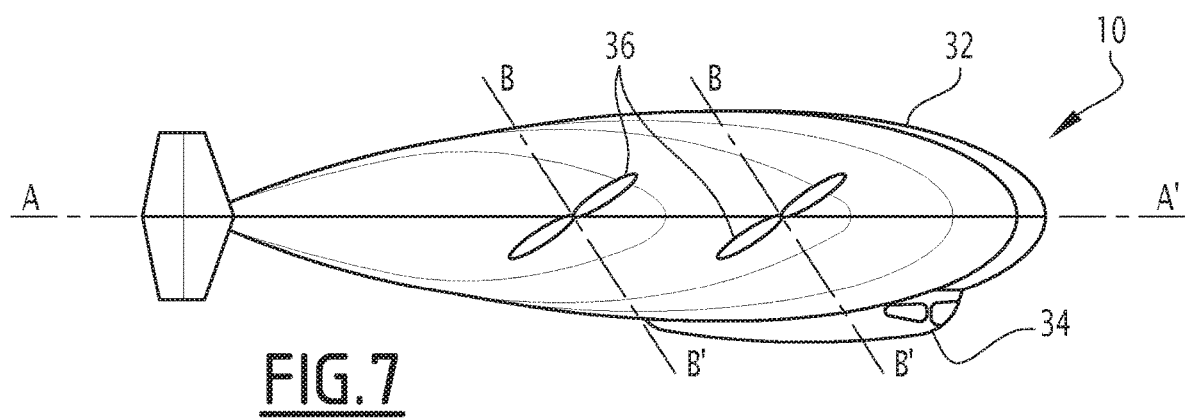
Figure 8:
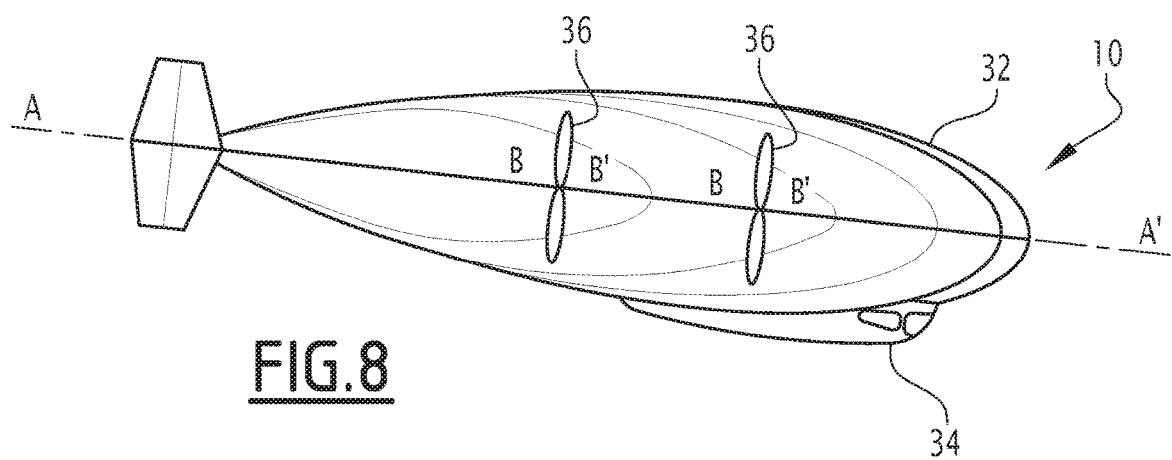

As shown in FIG. 6 to FIG. 8, the control unit 66 is able to selectively rotate each propeller 36 around the second pivoting axis 62 to modify the tilt angle of the propeller axis B-B' with respect to the longitudinal axis A-A' when the longitudinal axis A-A' is horizontal, from −180° to +180°, advantageously from −90° to 90° to generate a force having a purely vertical lift or descent (or reverse lift) component (see FIG. 6), a longitudinal driving component able to move the hybrid airship along the longitudinal axis A-A' (see FIG. 8) and/or a force having a mix of a vertical lift or descent component and of a longitudinal driving component (FIG. 7).

Figure 11:
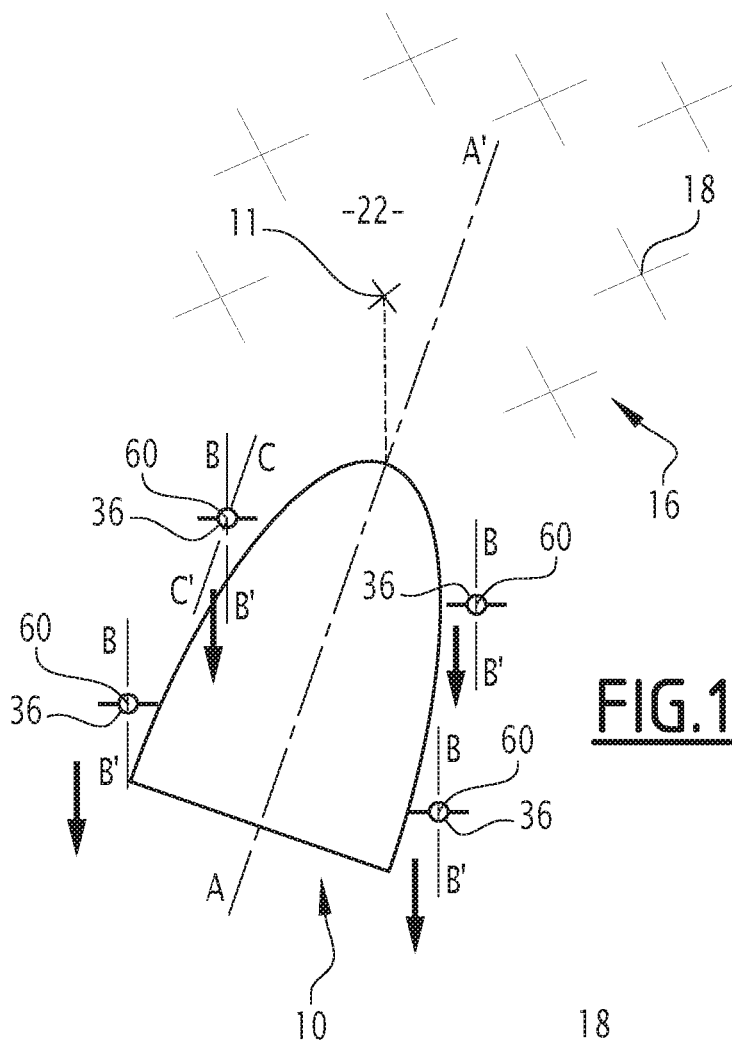
FIG. 11 and FIG. 12 are top view of the airship in the vicinity of the target location, when a transverse force is generated by the propellers.

As shown in FIG. 11, the control unit 66 is able to selectively rotate each propeller 36 around the first pivoting axis 60 to modify the tilt angle of the propeller axis B-B' with regards to an axis perpendicular to the second pivot axis 62 from −180° to +180°, preferentially from −90° to +90° to include a transverse driving component able to move the hybrid airship 10 transversely to the longitudinal axis A-A'.

A method for transporting a payload 30 to a target location 11 will be now described.

Initially, the hybrid airship 10 is carried in a deflated state to an assembly location, for example a base camp 26.

Figure 9:
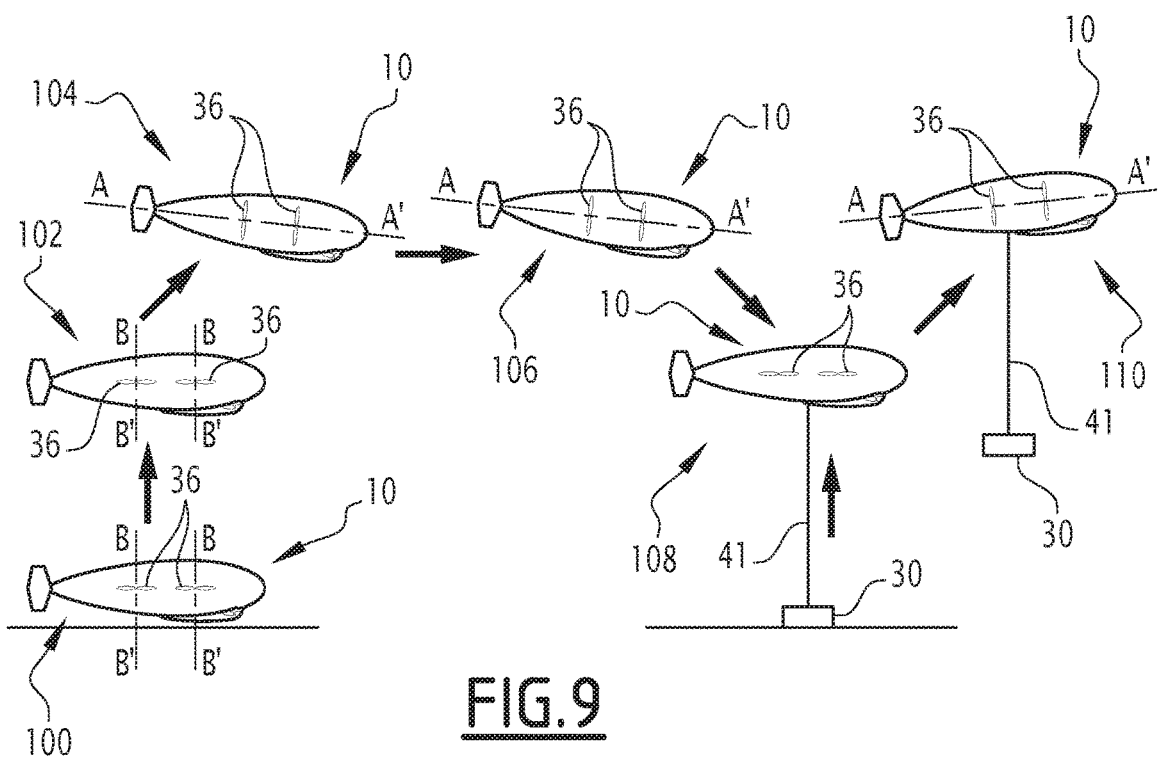
FIG. 9 illustrates a flight of the airship from an initial position to a position at which a payload is connected to the airship.

The hybrid airship 10 is assembled and the buoyancy enclosure is filled with a gas lighter than air, as shown in step 100 of FIG. 9.

Advantageously, the control mechanism 49 of each propeller 36 is actuated to place the propeller axis B-B' in a substantially vertical position to generate a lift force with the propeller 36. As shown in step 102 of FIG. 9, the hybrid airship 10 is lifted by the combination of the positive buoyancy and of the lift force.

At a target altitude for the payload, for example greater than 30 m above canopy, the propeller axis B-B' is progressively tilted by rotation around the second pivot axis 62 to generate a force having a longitudinally driving component and move longitudinally the airship 10.

At step 104 of FIG. 9, the propeller axis B-B' is set parallel to the longitudinal axis A-A'. The tilting controller 46 is activated to generate a negative pitch of the longitudinal axis A-A' of the hybrid airship 10.

The negative pitch creates an aerodynamic descent force on the hybrid airship 10 when the hybrid airship 10 moves longitudinally. The aerodynamic descent force compensates the positive buoyancy, and allows the altitude of the hybrid airship 10 to remain constant (see step 106 of FIG. 9).

In the vicinity of the payload position, the propellers 36 are again rotated around the second pivot axis 62 to generate a force having an increasing descent component. When the hybrid airship reaches a location above the payload 36, the propeller axis B-B' is set vertical again to allow a descending stationary flight above the payload 36 (see step 108 of FIG. 9).

The payload carrying apparatus 41 is then deployed to the payload 30. The payload 30 is subsequently connected to the payload carrying apparatus 41. When the payload is heavy, the combined buoyancy of the hybrid airship 10 carrying the payload is negative.

The control unit 66 is then actuated to pivot the propellers 36, advantageously by setting the propeller axis B-B' to be vertical in order to generate a vertical lift force compensating the negative buoyancy.

The hybrid airship 10 carrying the payload 30 climbs above the ground. At step 110 of FIG. 9, the propeller axis B-B' is pivoted around the second pivot axis 62 to generate a force having a longitudinal component.

The pitch angle of the longitudinal axis is raised to a positive value, for example greater than 0.°, in particular greater than 1° and generally comprised between 0° and 15°, in particular between 0.5° and 5° to generate an aerodynamic lift force in addition to the lift component generated by the propellers 36.

The aerodynamic lift force for example ranges between 40% and 60% of the total lift force generated by the propellers 36 and the aerodynamic lift force.

The use of a positive pitch of the hybrid airship 10 in the method according to the invention therefore allows the airship to carry heavier payloads 30 without having to significantly increase the size of the buoyancy enclosure 32 or without having to generate a greater lift force with the propellers 36.

Figure 10:
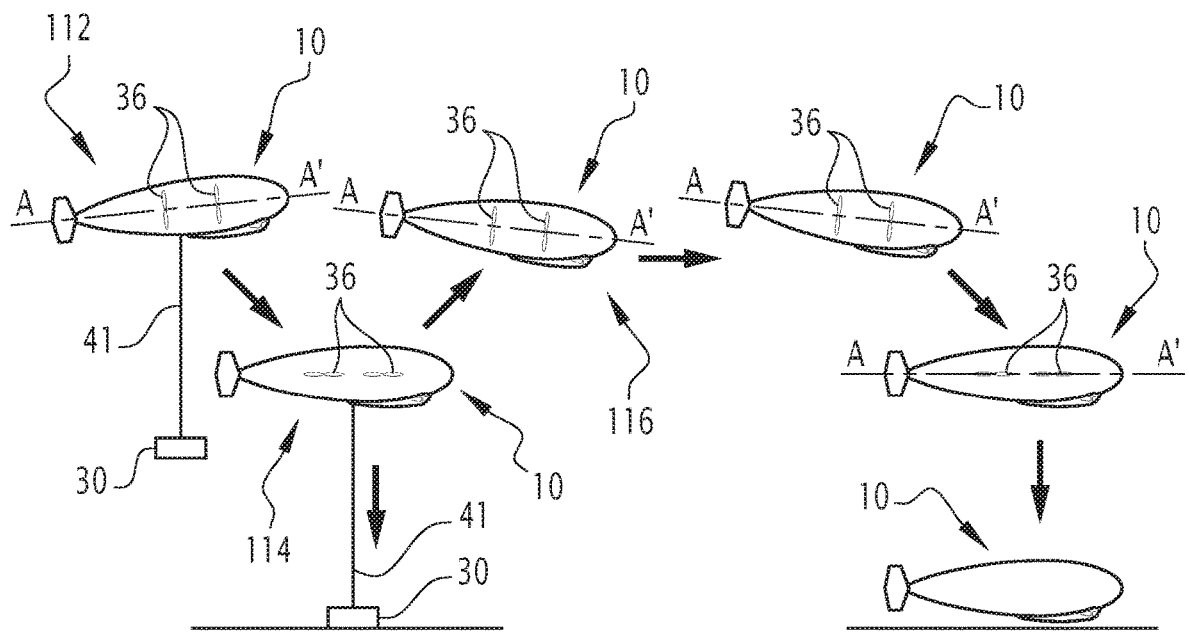
FIG. 10 illustrates a flight of the airship from the position at which the payload is connected to the airship to a target position at which the payload is dropped.

At step 112 of FIG. 10, when reaching the vicinity of the target location 11, the pitch of the longitudinal axis A-A' of the hybrid airship 10 is progressively decreased and/or the orientation of the propeller axis B-B' around the second pivot axis 62 is modified to generate a descent force.

The hybrid airship 10 progressively descends towards the target location 11 while moving longitudinally towards it.

Figure 12:
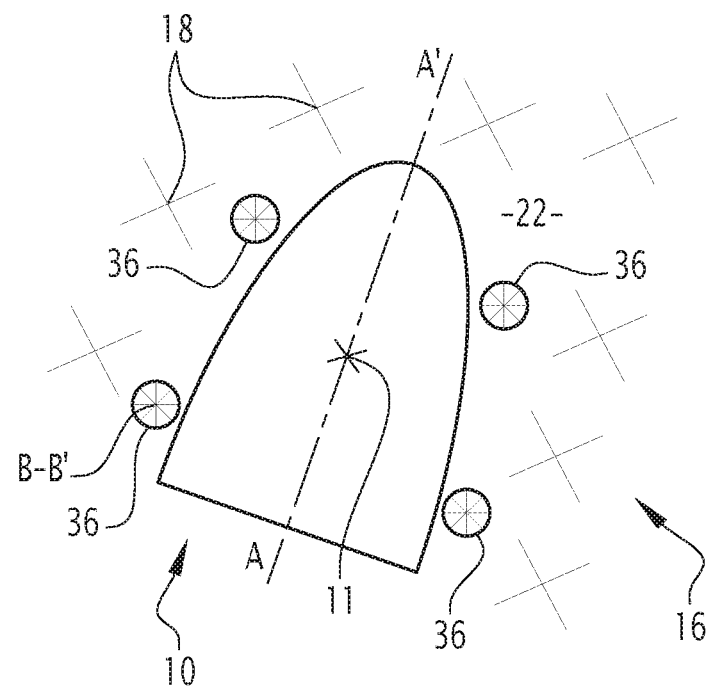

If the longitudinal axis A-A' is transversely offset of the exact target location 11, the control unit 66 is actuated to rotate the propellers 36 around the first pivot axis 60. The propeller axis B-B' tilts with respect to an axis C-C' parallel to the longitudinal axis and each propeller 36 generates a transverse moving force. The longitudinal axis A-A' of the hybrid airship 10 moves transversely to align the target location 11 with the longitudinal axis A-A', as shown in FIG. 11 and FIG. 12.

In the method according to the invention, the position of the hybrid airship 10 can therefore be finely controlled not only vertically, but also horizontally, without having to carry out complicated go-around procedures if the target location 11 is not perfectly aligned with the longitudinal axis A-A'.

This is particularly useful in a remote environment such as a region of interest 12 comprising vegetation 16 and clearings 22 of small volumes.

Then, as shown in step 114 of FIG. 10, the propeller axes B-B' are vertically oriented, and a stationary descent of the hybrid airship 10 is carried out until the payload touches the target location 11.

The payload 30 is then disconnected from the payload carrying apparatus 41 and the airship 10 flies back to another location, for example to the base camp 26 (step 116), in a manner similar to steps 102 to 106.

In a variant (not shown), the rotor 48 of the or each propeller 36 is able to rotate in two opposite directions. The propeller is able to generate either a lift force or a descent force depending of the direction of rotation, without having to rotate the propeller 36 around the second pivot axis 62.

In another variant, the transverse adjustment of the position of the longitudinal axis A-A' is carried out without longitudinally moving the hybrid airship 10 along the longitudinal axis A-A'.

In another variant, the payload 30 is directly received in the gondola 34 or is attached to the gondola 34. The payload carrying apparatus 41 is for example a bay defined in the gondola 34 or a structure fixed under the gondola 34.

The payload 30 is not necessarily dropped at the target location 11, but can remain connected to the gondola 34 at a distance from the ground at the target location 11.

For example, the payload 34 advantageously comprises sensors to carry out measurements. These sensors are, for example, active sensors such as electro-magnetic sensors, laser sensors (LIDAR) or infrared sensors or passive sensors measuring the gravitational field or the magnetic field.

The invention claimed is:

1. A method for transporting a payload to a target location comprising:
   providing a hybrid airship comprising a buoyancy enclosure containing a gas lighter than air, the buoyancy enclosure having a longitudinal axis, the hybrid airship comprising a gondola carried by the buoyancy enclosure and a payload connected to said buoyancy enclosure, at least one propeller configured to generate a force when rotated around a propeller axis, a controller controlling an orientation of the at least one propeller with regard to the buoyancy around at least one axis to modify the orientation of the force generated by the at least one propeller, and at least one rudder protruding from the buoyancy enclosure and at least a tilting controller able to control the rudder to modify the a pitch angle of the hybrid airship; and flying the hybrid airship carrying the payload to the target location, wherein flying the hybrid airship carrying the payload comprises generating a lift force with the at least one propeller and comprises tilting the longitudinal axis of the buoyancy enclosure to a positive pitch, by controlling the rudder, to generate an aerodynamic lift force when the hybrid airship carrying the payload moves longitudinally at a first target altitude, before flying the hybrid airship carrying the payload to the target location:
flying the hybrid airship to the payload and connecting the payload carrier to the payload; and
lifting the payload;

after flying the hybrid airship carrying the payload to the target location, descending the hybrid airship and the payload to drop the payload at the target location;

if the longitudinal axis is transversely offset of the exact target location, rotating the at least one propeller around a first pivot axis perpendicular to the propeller axis so that said propeller axis tilts with respect to an axis parallel to the longitudinal axis and generates a transverse moving force, and after dropping the payload at the target location, flying back the hybrid airship without a payload, or with a payload such that the combined hybrid airship plus payload has a buoyancy lighter than air, wherein flying back the hybrid airship comprises tilting the longitudinal axis of the buoyancy enclosure, by controlling the rudder, to a negative pitch to generate an aerodynamic descent force when the hybrid airship moves longitudinally at a second target altitude.

2. The method according to claim 1, wherein the positive pitch is greater than 0.5°.

3. The method according to claim 1, wherein flying back the hybrid airship comprises generating a descent force with the at least one propeller.

4. The method according to claim 1, wherein flying the hybrid airship to the payload comprises generating a lift force with the at least one propeller to lift the airship to a target altitude.

5. The method according to claim 4, wherein flying the hybrid airship to the payload comprises, after reaching the target altitude, tilting the longitudinal axis of the buoyancy enclosure to a negative pitch to generate an aerodynamic descent force when the hybrid airship moves longitudinally.

6. The method according to claim 1, wherein flying the hybrid airship carrying the payload to the target location comprises actuating the controller controlling the orientation of the at least one propeller to generate a force having a component transverse to the longitudinal axis to transversally adjust a position of the longitudinal axis of the buoyancy enclosure with respect to the target location.

7. The method according to claim 6, wherein the controller controlling the orientation of the at least one propeller comprises the first pivot axis of the at least one propeller with regard to the buoyancy enclosure which is at least substantially vertical when the propeller axis is horizontal, and wherein the controller controlling the orientation of the at least one propeller rotates the at least one propeller around the first pivot axis to generate the force having a component transverse to the longitudinal axis.

8. The method according to claim 6, wherein the controller controlling the orientation of the at least one propeller comprises a second pivot axis of the at least one propeller with regard to the buoyancy enclosure which is at least substantially horizontal when the longitudinal axis is horizontal, and wherein the controller controlling the orientation of the at least one propeller rotates the at least one propeller around the second pivot axis to generate the lift force.

9. The method according to claim 8, wherein the first pivot axis is rotatable around the second pivot axis, and wherein rotating the at least one propeller around the second pivot axis generates a rotation of the first pivot axis around the second pivot axis.

10. The method according to claim 6, wherein the transverse adjustment of the position of the longitudinal axis is carried out without longitudinally moving the hybrid airship.

11. The method according to claim 2, wherein the positive pitch is between 0.5° and 15°.

12. The method according to claim 11, wherein the positive pitch is between 0.5° and 5°.

13. The method according to claim 1, wherein the hybrid airship moves longitudinally, with substantially no upward or downward movement.

14. A hybrid airship for transporting a payload to a target location, comprising:
a buoyancy enclosure containing a gas lighter than air, the buoyancy enclosure having a longitudinal axis;
a gondola carried by the buoyancy enclosure;
a payload carrier connected to said buoyancy enclosure;
at least one propeller comprising at least a blade able to generate a force when rotated around a propeller axis;
a controller controlling an orientation of the at least one propeller with regard to the buoyancy enclosure around at least one axis to modify the orientation of the generated force, the controller controlling the orientation of the at least one propeller being able to control the orientation of the at least one propeller to generate a lift force with the at least one propeller when flying the hybrid airship carrying the payload;
said controller being further able to control rotating the at least one propeller around a first pivot axis perpendicular to the propeller axis so that said propeller axis tilts with respect to an axis parallel to the longitudinal axis and generates a transverse moving force;
at least one rudder protruding from the buoyancy enclosure; and
a tilting controller configured to:
tilt the longitudinal axis of the buoyancy enclosure to a positive pitch, by controlling the rudder, to generate an aerodynamic lift force when the hybrid airship carrying the payload moves longitudinally, at a first target altitude, and
tilt the longitudinal axis of the buoyancy enclosure to a negative pitch, by controlling the rudder, to generate an aerodynamic descent force when the hybrid airship moves longitudinally, at a second target altitude, without a payload or with a payload such that the combined hybrid airship plus payload has a buoyancy lighter than air.

15. The hybrid airship according to claim 14, wherein the controller controlling the orientation of the at least one propeller is able to control the orientation of the at least one propeller to generate a force having a component transverse to the longitudinal axis to transversally adjust a position of the longitudinal axis of the enclosure with respect to the target location.

16. The hybrid airship according to claim 15, wherein the controller controlling the orientation of the at least one propeller comprises the first pivot axis of the at least one propeller with regard to the buoyancy enclosure which is at least substantially vertical when the propeller axis is horizontal, the controller controlling the orientation of the at least one propeller being able to rotate the at least one propeller around the first pivot axis to generate the force having a component transverse to the longitudinal axis.

17. The hybrid airship according to claim 14, wherein the hybrid airship carrying the payload moves longitudinally, with substantially no upward or downward movement.

\* \* \* \* \*